(12) United States Patent
Carrier

(10) Patent No.: US 7,543,016 B2
(45) Date of Patent: Jun. 2, 2009

(54) METHOD, SYSTEM AND PROGRAM PRODUCT FOR AUTOMATICALLY ASSIGNING ELECTRONIC ADDRESSES TO USERS

(75) Inventor: Scott R. Carrier, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 978 days.

(21) Appl. No.: 10/632,444

(22) Filed: Jul. 31, 2003

(65) Prior Publication Data

US 2005/0027883 A1 Feb. 3, 2005

(51) Int. Cl.
*G06F 15/16* (2006.01)
*G06F 17/30* (2006.01)

(52) U.S. Cl. .............. 709/200; 709/206; 709/203; 707/3

(58) Field of Classification Search .............. None
See application file for complete search history.

(56) References Cited

U.S. PATENT DOCUMENTS

| 5,966,714 | A | 10/1999 | Huang et al. | |
|---|---|---|---|---|
| 6,161,129 | A | 12/2000 | Rochkind | |
| 6,654,789 | B1 * | 11/2003 | Bliss et al. | 709/206 |
| 2002/0032740 | A1 | 3/2002 | Stern et al. | |
| 2002/0065891 | A1 * | 5/2002 | Malik | 709/206 |
| 2002/0138581 | A1 * | 9/2002 | MacIntosh et al. | 709/206 |
| 2002/0194308 | A1 * | 12/2002 | Hall | 709/219 |
| 2004/0024823 | A1 * | 2/2004 | Del Monte | 709/206 |

FOREIGN PATENT DOCUMENTS

| JP | 9275415 A | 10/1997 |
|---|---|---|
| JP | 10032601 | 2/1998 |
| JP | 10313338 A | 11/1998 |
| JP | 11046212 A | 2/1999 |
| WO | WO 01/13576 A2 | 2/2001 |

OTHER PUBLICATIONS

Huck et al., "A Self-Configuring and Self-Administering Name System with Dynamic Address Assignment", ACM Transactions on Internet Technology, vol. 2, No. 1, Feb. 2002, pp. 14-46.
Araujo et al., "Global Array Reference Allocation", ACM Transactions on Design Automation of Electronic Systems, vol. 7, No. 2, Apr. 2002, pp. 336-357.
IBM Technical Disclosure Bulletin, "Calendar System Management Through User List Association", vol. 37, No. 02B, Feb. 1994, pp. 637-638.

* cited by examiner

*Primary Examiner*—Wen-Tai Lin
(74) *Attorney, Agent, or Firm*—Hoffman Warnick LLC; Ayla A. Lari

(57) ABSTRACT

Under the present invention user data corresponding to a user requiring an electronic address, and a sequence of address generation scripts is provided. An electronic address is generated according to the user data and the first address generation script in the sequence. After generation, the electronic address is tested for validity. Specifically, it is determined whether the electronic address is both unique, and complies with a predetermined addressing standard (e.g., RFC 2822). If the electronic address is valid, it is assigned to the user. However, if the electronic address is not valid, a new electronic address is generated according to the next address generation script in the sequence. The new address is then tested for validity. This process continues until a valid electronic address is generated, or all of the address generation scripts in the sequence have been exhausted.

26 Claims, 3 Drawing Sheets

US 7,543,016 B2

METHOD, SYSTEM AND PROGRAM PRODUCT FOR AUTOMATICALLY ASSIGNING ELECTRONIC ADDRESSES TO USERS

BACKGROUND OF THE INVENTION

1. Field of the Invention

The present invention generally relates to a method, system and program product for automatically assigning electronic addresses to users. More specifically, the present invention allows valid electronic mailing addresses to be automatically assigned to computer users.

2. Related Art

As the use of electronic mail becomes more pervasive, the complexity involved in assigning electronic mailing addresses grows. Specifically, with the number of electronic mail users exploding, there is an increasing need to avoid non-unique and/or non-compliant electronic mailing addresses. That is, not only should the users have a unique electronic mailing address, but the electronic mailing addresses should conform to any applicable addressing standards (e.g., RFC 2822). These issues are especially important in an organization that has numerous members (e.g., an employer).

In general, a particular organization might have one or two preferred formats for their electronic mailing addresses. For example, "ABC, Inc." might want all electronic mailing addresses of its employees to include a first initial and a complete last name. Thus, an individual named "Joe Smith" would have an electronic mailing address of JSMITH@ABC.COM. Such formatting requirements, however, could lead to two different individuals with the same name being assigned the same electronic mailing address. In an attempt to avoid this, and to provide compliance with any applicable addressing standards, previous systems have required an administrator or the like to manually validate and/or assign electronic mailing addresses. Such a requirement can be extremely burdensome and expensive in organizations having numerous members.

Other systems, such as that disclosed in U.S. Patent Application Publication No. US 2002/0032740 A1 (hereby incorporated by reference), attempt to "guess" existing electronic mailing addresses of users. For example, assume a sales organization has ten members of Company "XYZ" in its database. Further assume that the sale organization only has one of the ten members' electronic mailing addresses. The previous system could be utilized to reverse engineer the one address in an attempt to determine the addresses of the other nine individuals. Specifically, once a set of possible format patterns is deduced by reverse engineering the known address, the format patterns are used to generate a collection of "possible" electronic mailing addresses for the other members of the organization. Once the possible addresses are generated, test emails are sent thereto. Unfortunately, test emails of this nature can significantly consume the resources (e.g., the routers) of the receiving organization. Moreover, the test emails could be blocked by anti-spam software.

In view of the foregoing, there exists a need for a method, system and program product for automatically assigning electronic addressees (e.g., as electronic mailing addresses). Specifically a need exists for a system that allows a sequence of address generation scripts to be provided. A further need exists for a single electronic address to be generated according to a first script in the sequence, and then be tested for uniqueness and compliance. Still yet, a need exists for a new address to be generated according to a next script in the sequence if the first address is not both unique and compliant.

SUMMARY OF THE INVENTION

In general, the present invention provides a method, system and program product for automatically assigning electronic (mailing) addresses to users. Specifically, under the present invention, user data corresponding to a user requiring an electronic address and a sequence of address generation scripts is provided. An electronic address is generated according to the user data and the first address generation script in the sequence. After generation, the electronic address is tested for validity. Specifically, it is determined whether the electronic address is both unique, and complies with a predetermined addressing standard (e.g., RFC 2822). If the electronic address is valid, it is assigned to the user. However, if the electronic address is not valid, a new electronic address is generated according to the next address generation script in the sequence. The new address is then tested for validity. This process continues until a valid electronic address is generated, or all of the address generation scripts in the sequence have been exhausted.

A first aspect of the present invention provides a method for automatically assigning electronic addresses to users, comprising: providing a sequence of address generation scripts; determining a valid electronic address for a user by iterating through the sequence of address generation scripts, wherein the valid electronic address is determined when one of the address generation scripts produces an electronic address that is unique and complies with a predetermined addressing standard; and assigning the valid electronic address to the user.

A second aspect of the present invention provides a method for automatically assigning electronic addresses to users, comprising: providing a sequence of address generation scripts; retrieving user data from a repository, wherein the user data corresponds to a user requiring an electronic address; generating the electronic address for the user according to the user data and a first one of the sequence of address generation scripts; determining if the electronic address is valid, wherein the electronic address is valid if the electronic address is unique and complies with a predetermined addressing standard; and assigning the electronic address to the user if the electronic address is valid, wherein a new electronic address is generated for the user according to a second one of the sequence of electronic address generation scripts if the electronic address is not valid.

A third aspect of the present invention provides a system for automatically assigning electronic addresses to users, comprising: an address generation system for generating a first electronic address for a user according to a first one of a sequence of address generation scripts; a validity system for determining whether the first electronic address is valid, wherein the first electronic address is valid if the first electronic address is unique and complies with a predetermined addressing standard; and an assignment system for assigning the first electronic address to the user if the first electronic address is valid, wherein a second electronic address is generated by the address generation system according to a next one of the sequence of address generation scripts if the first electronic address is not valid.

A fourth aspect of the present invention provides a program product stored on a recordable medium for automatically assigning electronic addresses to users, which when executed, comprises: program code for generating a first electronic address for a user according to a first one of a sequence of address generation scripts; program code for determining whether the first electronic address is valid, wherein the first electronic address is valid if the first electronic address is unique and complies with a predetermined addressing standard; and program code for assigning the first electronic address to the user if the first electronic address is valid, wherein a second electronic address is generated according to a next one of the sequence of address generation scripts if the first electronic address is not valid.

Therefore, the present invention provides a method, system and program product for automatically assigning electronic addresses to users.

BRIEF DESCRIPTION OF THE DRAWINGS

These and other features of this invention will be more readily understood from the following detailed description of the various aspects of the invention taken in conjunction with the accompanying drawings in which.

Figure 1:
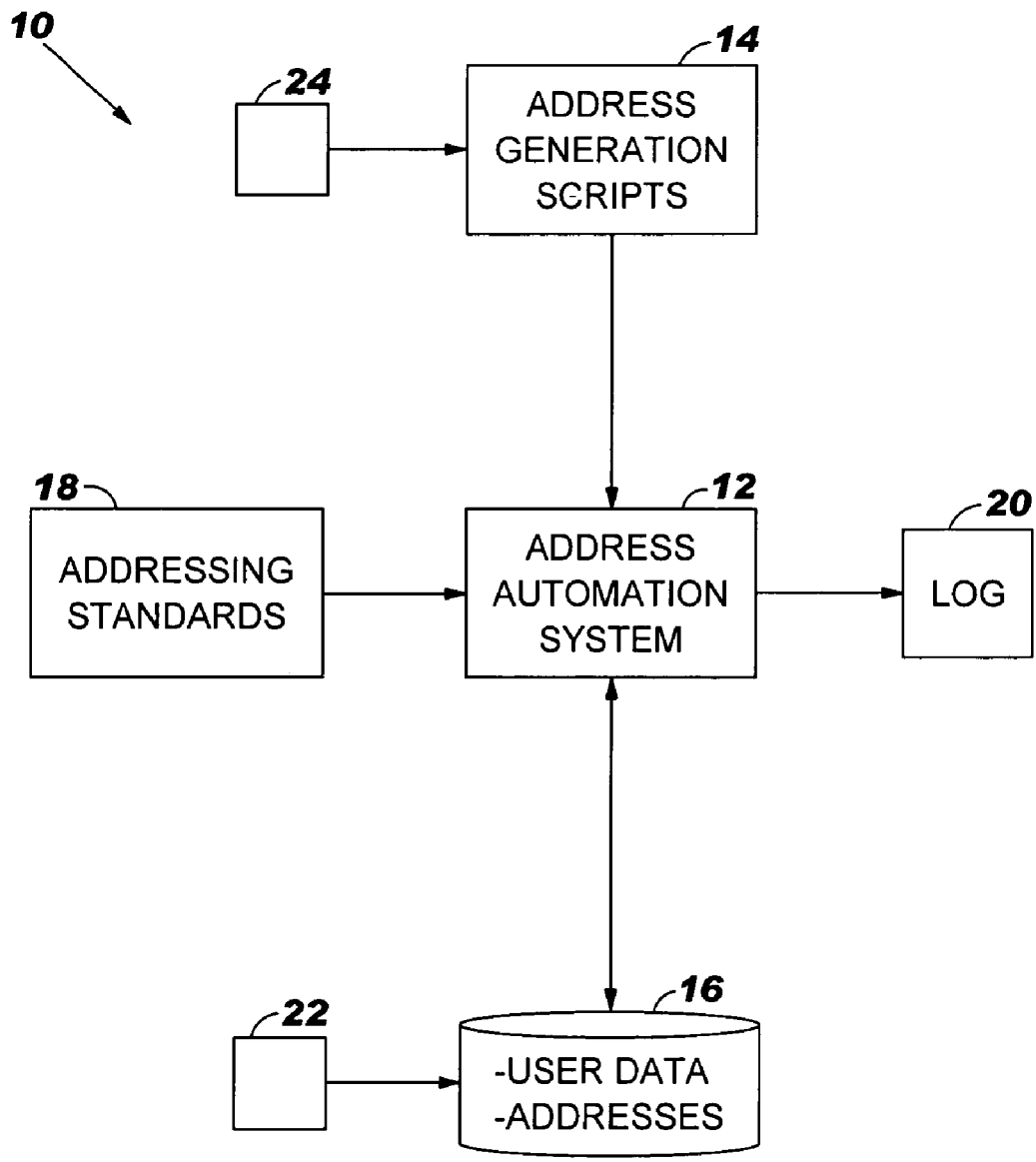
FIG. 1 depicts a system for automatically assigning electronic (mailing) addresses to users, according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system and program product for automatically assigning electronic (mailing) addresses to users. Specifically, under the present invention, user data corresponding to a user requiring an electronic address and a sequence of address generation scripts is provided. An electronic address is generated according to the user data and the first address generation script in the sequence. After generation, the electronic address is tested for validity. Specifically, it is determined whether the electronic address is both unique, and complies with a predetermined addressing standard (e.g., RFC 2822). If the electronic address is valid, it is assigned to the user. However, if the electronic address is not valid, a new electronic address is generated according to the next address generation script in the sequence. The new address is then tested for validity. This process continues until a valid electronic address is generated, or all of the address generation scripts in the sequence have been exhausted.

It should be understood in advance that as used herein, the term electronic address is intended to refer to an electronic mailing address. However, it should be understood that the teachings of the present invention could be implemented to automatically assign any type of electronic or computer-based address such as IP addresses, MAC addresses, etc.

Referring now to FIG. 1, a system 10 for automatically assigning electronic addresses to users according to the present invention is shown. In general, user 22 is assigned an electronic address according to user data corresponding thereto and a sequence (e.g., one or more) of address generation scripts 14. For example, when user 22 joins an organization, user data corresponding thereto is inserted into repository 16. Such data can include biographical information such user 22's full name. Address generation scripts 14 are typically provided by an administrator 24 in a particular sequence. To this extent, each script is typically provided in plain text so as to be platform-independent. Further, address generation scripts 14 need not include certain key words or syntax that are "registered." Each script sets forth a particular format for which an electronic address should be generated. To this extent, each script in the sequence specifies certain data field attribute values that are to be used to generate an electronic address. For example, assume that administrator 24 has provided the following sequence of address generation scripts:

1. givenName,<_>,sn
2. (1)givenName,sn
3. givenName,(1)sn

For these scripts, "givenName" refers to the first name of a user, while "sn" refers to the surname or last name of the user. Content inserted between carrots (i.e., < >) refers to content that will literally inserted into the electronic address. Numbers enclosed within parentheses refer to the quantity of letters of the attribute value to which it is attached that should be used in the electronic address. Under the present invention, these scripts are used in order by address automation system 12 (in conjunction with user data) in an attempt to provide a valid electronic address. For example, the above address generation scripts would produce the following electronic addresses for "Joe Smith" of "ABC, Inc.":

1. JOE_SMITH@ABC.COM
2. JSMITH@ABC.COM
3. JOES@ABC.COM

Since address automation system 12 will iterate through the sequence of address generation scripts 14 in order, address automation system 12 will first generate an electronic address of JOE_SMITH@ABC.COM. Once generated, address automation system will determine if this electronic address is valid. In determining whether the electronic address is valid, address automation system 12 performs at least two functions. Specifically, address automation system 12 will first determine whether an electronic address is unique, and also whether the electronic address complies with any applicable predetermined addressing standards 18. In determining whether the electronic address is unique, address automation system 12 will compare the electronic address to a set (e.g., one or more) of previously created electronic addresses. Such addresses could be stored in repository 16 with user data, or in a second, independent repository (not shown in FIG. 1). In determining whether the electronic address is compliant, address automation system 12 could compare the electronic address to a predetermined address standard such as RFC 2822 (e.g., as provided by an outside source).

In any event, if the electronic address is valid, it is assigned to user 22 and an optional note could be made in log 20. Conversely, if the electronic address is not valid (i.e., it fails to be both unique and compliant), address automation system 12 could make a corresponding note in log 20 and proceed to the next address generation script in the sequence 14. As shown above, this will result in the electronic address of JSMITH@ABC.COM. Similar to the first electronic address, this electronic address is tested for validity. If the electronic address is valid, it is assigned to user 22. However, if the electronic address is not valid, an optional note to that effect could be made in log 20, and the third script in sequence 14 is used to generate an electronic address of JOES@ABC.COM. Just as with the two previous electronic addresses, this third electronic address is tested for validity. If the electronic address is valid, it is assigned to user 22 and an optional note could be made in log 20. However, if the electronic address is not valid, a note could be made in log 20 and the process is ended. Therefore, the present invention will iterate through the sequence of address generation scripts 14 until a valid electronic address is generated and assigned to user 22, or until the sequence of address generation scripts 14 is exhausted.

Once a valid electronic address is determined, it is assigned to user 22 in repository 16, or in some other repository containing electronic addresses. To this extent, it should be understood that repository 16 is intended to represent any object and/or system in which data can be stored and/or retrieved that implements that notion of iterative elements or nodes, and that can be programmatically accessed. For example, repository 16 can be a database, extended markup language (XML), a file, a directory (e.g., Lightweight Directory Access Protocol directory), etc. As such, repository 16 could include one or more storage devices, such as a magnetic disk drive or an optical disk drive. In another embodiment, repository 16 could include data distributed across, for example, a local area network (LAN), wide area network (WAN) or a storage area network (SAN) (not shown).

Figure 2:
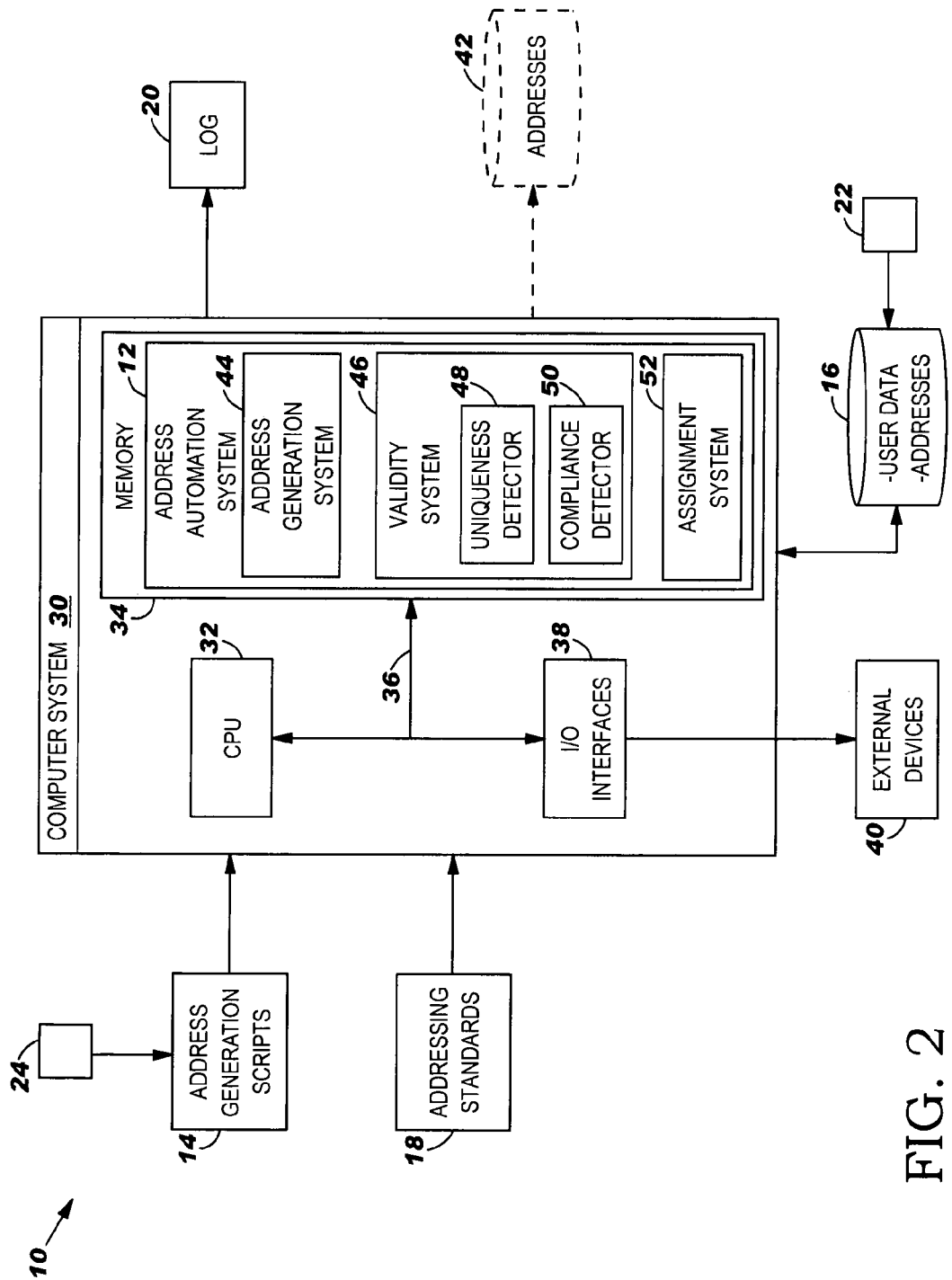
FIG. 2 depicts a more detailed diagram of the system of FIG. 1

Referring to FIG. 2, system 10 is shown in greater detail. As depicted, system 10 includes computer system 30, which includes address automation system 12. In general, computer system 30 can be any type of computerized system capable of carrying out the functions described herein. For example, computer system 30 could be a personal computer, a laptop, a handheld device, etc. In addition, the teachings of the present invention could be implemented in a network environment such as over the Internet, a wide area network (WAN), a local area network (LAN), a virtual private network (VPN), etc. For example, address automation system 12 could be loaded on a mail server within a network, while individual users operate clients. In a network environment, communication between the clients and server could occur via a direct hardwired connection (e.g., serial port) or via an addressable connection that may utilize any combination of wireline and/or wireless transmission methods. To this extent, the server and clients may utilize conventional network connectivity, such as Token Ring, Ethernet, WiFi or other conventional communications standards. Moreover, connectivity could be provided by conventional TCP/IP sockets-based protocol. In this instance, the clients would utilize an Internet service provider to establish connectivity to the server.

As shown, computer system 30 generally comprises central processing unit (CPU) 32, memory 34, bus 36, input/output (I/O) interfaces 38, external devices/resources 40 and repository 16. CPU 32 may comprise a single processing unit, or be distributed across one or more processing units in one or more locations, e.g., on a client and computer system. Memory 34 may comprise any known type of data storage and/or transmission media, including magnetic media, optical media, random access memory (RAM), read-only memory (ROM), a data cache, a data object, etc. Moreover, similar to CPU 32, memory 34 may reside at a single physical location, comprising one or more types of data storage, or be distributed across a plurality of physical systems in various forms.

I/O interfaces 38 may comprise any system for exchanging information to/from an external source. External devices/resources 40 may comprise any known type of external device, including speakers, a CRT, LCD screen, hand-held device, keyboard, mouse, voice recognition system, speech output system, printer, monitor/display, facsimile, pager, etc. Bus 36 provides a communication link between each of the components in computer system 30 and likewise may comprise any known type of transmission link, including electrical, optical, wireless, etc.

Shown in memory 34 of computer system 30 is address automation system 12, which includes address generation system 44, validity system 46 and assignment system 52. In general, if an electronic address needs to be generated for user 22, address generation system will access both user data corresponding to user 22, as well as the sequence of address generation scripts (e.g., as provided by administrator 24). Thereafter, address generation system will generate a first electronic address for user 22 according to the user data and the first address generation script in the sequence 14. Once generated, validity system 46 will determine if the first electronic address is valid. Specifically, uniqueness detector 48 will compare the first electronic address to a set previously created electronic addresses. If an exact match exists, the first electronic address is not unique. As described above, previously created electronic addresses could be located in repository 16 from where the user data was extracted, or in a different location such as electronic address repository 42 (shown in phantom). In any event, compliance detector 50 will then determine whether the first electronic address complies with any applicable, predetermined addressing standards 18. For example, compliance detector 50 could compare the first electronic address with address standards 18 (e.g., RFC 2822 as provided by an outside source). If the first electronic address is both unique and compliant, it is valid. Once determined to be valid, assignment system 52 will assign the first electronic address to user 22, make an optional note in log 20, and assign the first electronic address (e.g., in repository 16 or 42).

If the electronic address is either not unique or not compliant, it is not valid. Thus, address generation system 44 will generate a second electronic address according to the user data and the second address generation script in sequence 14. Similar to the first electronic address, the second electronic address is tested for validity. That is, uniqueness detector 48 determines if the second electronic address is unique, while compliance detector 50 determines if it complies with the applicable, predetermined addressing standards 18. If the second electronic address proves to be valid, it is assigned to user 22, an optional note is made in log 20, and the address is saved.

If, however, the second electronic address is not valid, address automation system 12 will repeat the process with the third address generation script in sequence 14. To this extent, address automation system 12 will continue to iterate through the sequence of address generation scripts 14 (in order) until a valid electronic address is identified, or until all scripts in the sequence 14 are exhausted.

An optional feature under the present invention allows administrator 24 to specify whether he/she wishes to append numeric digits to electronic addresses in the event that a valid mail address had not been achieved through a completed iteration of address generation scripts 14. If enabled, this option would ensure that a unique address will be created during this process.

It should be understood that although the testing of validity was described herein as first testing for uniqueness and then for compliance, no specific order is intended to be inferred. For example, an electronic address can be tested for compliance and then for uniqueness.

Figure 3:
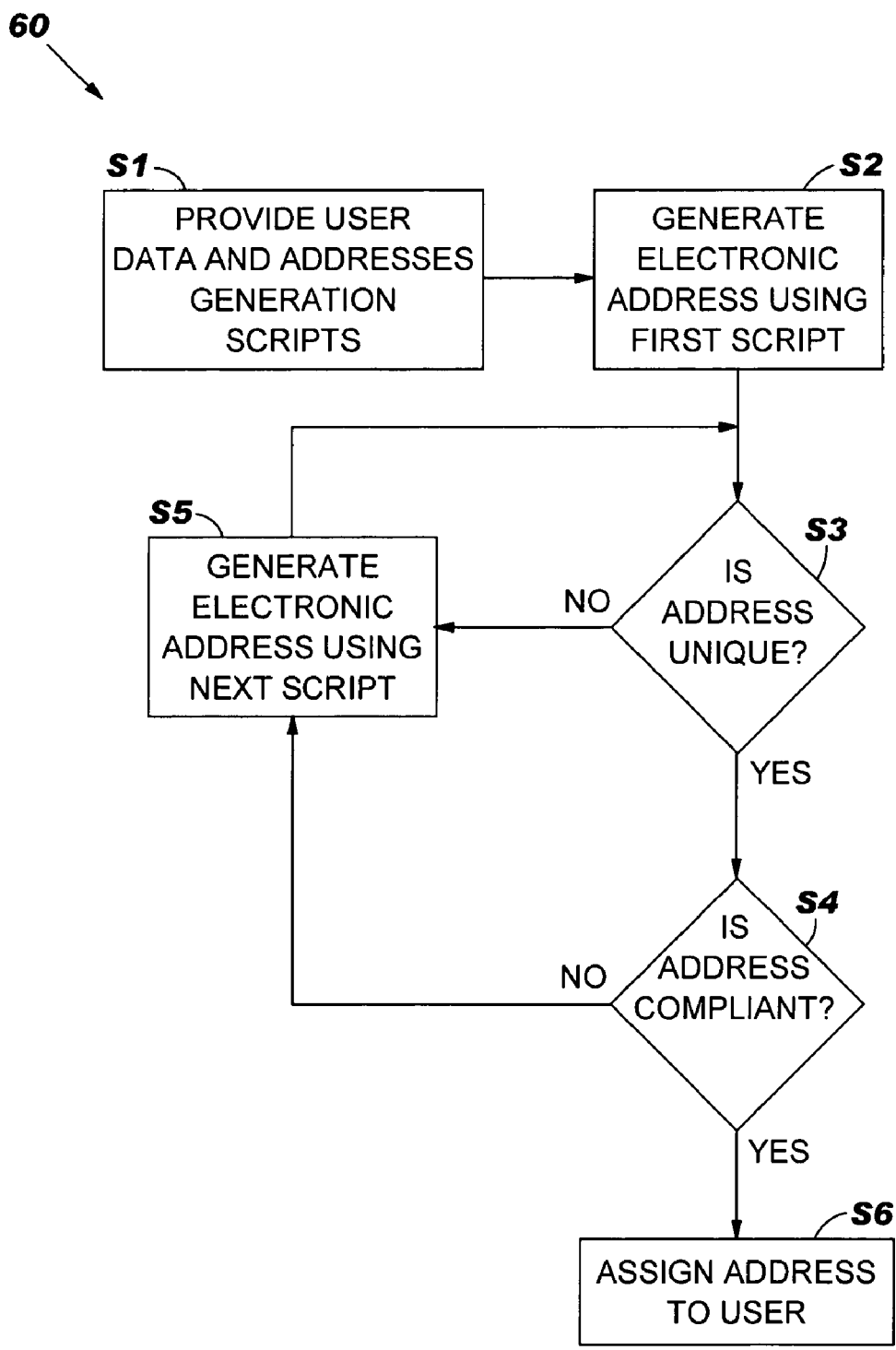
FIG. 3 depicts a method flow diagram, according to the present invention.

Referring now to FIG. 3, a method flow diagram 60 of the present invention is shown. As depicted, first step S1 of the method is to provide user data and a sequence of address generation scripts. Using the user data and the first script in the sequence, the address generation system will generate an electronic address in step S2. Once generated, it will be determined if the electronic address is unique in step S3. If the electronic address is unique, it is determined if it is compliant in step S4. If so, the address is assigned to the user in step S6. However, if the address is found to be either not unique in step S3 or non-compliant in step S4, a new electronic address is generated in step S5 using the next script in the sequence. Similar to the first electronic address generated in step S2, the new electronic address is tested for uniqueness in step S3 and compliance in step S4. This process continues until either a valid electronic address is determined and assigned to the user, or until all scripts in the sequence is exhausted.

It should be understood that the present invention can be realized in hardware, software, or a combination of hardware and software. Any kind of computer/computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

I claim:

1. A method for using a computer to automatically assign electronic addresses to users, comprising:
providing a sequence of address generation scripts, each address generation script including a unique template that defines a structure for an electronic address;
automatically determining a valid electronic address for assigning to a user by iterating through the sequence of address generation scripts in order of which address generation script is preferred by an organization to which the user belongs, wherein the valid electronic address is determined when one of the address generation scripts produces a previously unused electronic address that is unique and complies with a predetermined addressing standard;
allowing an administrator to enable a process to automatically append at least one numeric digit to the script-generated electronic address that does not comply with the predetermined addressing standard, wherein appending the at least one numeric digit creates a valid electronic address; and
automatically assigning the valid electronic address to the user,
wherein validation of the electronic address is performed within an address generation system without testing the uniqueness in a network environment.

2. The method of claim 1, wherein the electronic address is an electronic mailing address.

3. The method of claim 1, wherein the one of the address generation scripts that produces the previously unused electronic address using user data is provided from a repository and wherein the sequence of address generation scripts are generated by an administrator.

4. The method of claim 1, wherein the determining step comprises:
generating a first electronic address according to a first one of the sequence of address generation scripts; and
testing the first electronic address to determine if the first address is unique and complies with a predetermined addressing standard.

5. The method of claim 4, wherein the testing step comprises:
comparing the first electronic address to a set of previously created electronic addressed to determine if the first address is unique; and
comparing the first electronic address to the predetermined addressing standard to determine if the first electronic address is compliant.

6. The method of claim 5, wherein the set of previously created electronic addresses are stored in a repository with user data corresponding to the user.

7. The method of claim 5, wherein the set of previously created electronic addresses are stored in an electronic address repository.

8. A method for using a computer to automatically assign electronic addresses to users, comprising:
providing a sequence of address generation scripts, each address generation script including a unique template that defines a structure for an electronic address;
retrieving user data from a repository, wherein the user data corresponds to a user requiring an electronic address;
automatically generating the electronic address for the user according to the user data and a first one of the sequence of address generation scripts, the first one of the address generation scripts being first in order of preference by an organization to which the user belongs;
automatically determining if the electronic address is valid, wherein the electronic address is valid if the electronic address is unique and complies with a predetermined addressing standard; and
automatically assigning the electronic address to the user if the electronic address is valid, wherein a new electronic address is generated for the user according to a second one of the sequence of electronic address generation scripts if the electronic address is not valid, the second one of the address generation scripts being second in order of preference by the organization to which the user belongs, and wherein if the new electronic address is not valid, an administrator is allowed to enable a process to automatically append at least one numeric digit to the script-generated electronic address that does not comply with the predetermined addressing standard, wherein appending the at least one numeric digit creates the valid electronic address,
wherein validation of the electronic address is performed within an address generation system without testing the uniqueness in a network environment.

9. The method of claim 8, further comprising:
generating a new electronic address for the user according to the second one of the sequence of address generation scripts if the electronic address is not valid;
determining if the new electronic address is valid; and
assigning the new electronic address to the user if the new electronic address is valid.

10. The method of claim 8, wherein the determining step comprises determining if the electronic address is unique by comparing the electronic address to a set of previously created electronic addresses stored in the repository.

11. The method of claim 8, wherein the determining step comprises determining if the electronic address is unique by checking the electronic address against a set of previously created electronic addresses stored in an electronic address repository.

12. The method of claim 8, wherein the determining step comprises determining if the electronic address is compliant by comparing the electronic address to the predetermined addressing standard.

13. The method of claim 8, wherein the electronic address is an electronic mailing address.

14. The method of claim 8, wherein the sequence of address generation scripts comprises a plurality of address generation scripts.

15. A computer system for automatically assigning electronic addresses to users, comprising:
an address generation execution unit for generating a first electronic address for a user according to a first one of a sequence of address generation scripts, the first one of the address generation scripts being first in order of preference by an organization to which the user belongs, each address generation script including a unique template that defines a structure for an electronic address;
a validity execution unit for automatically determining whether the first electronic address is valid, wherein the first electronic address is valid if the first electronic address is unique and complies with a predetermined addressing standard; and
an assignment execution unit for automatically assigning the first electronic address to the user if the first electronic address is valid, wherein a second electronic address is generated by the address generation execution unit according to a next one of the sequence of address generation scripts if the first electronic address is not valid, the next one of the address generation scripts being next in order of preference by the organization to which the user belongs, and wherein if the second electronic address is not valid, an administrator is allowed to enable a process to automatically append at least one numeric digit to the script-generated electronic address that does not comply with the predetermined addressing standard, wherein appending the at least one numeric digit creates the valid electronic address,
wherein validation of the electronic address is performed within an address generation execution unit without testing the uniqueness in a network environment.

16. The computer system of claim 15, wherein the first and second electronic addresses are electronic mailing addresses.

17. The computer system of claim 15, wherein the first electronic address is generated according to user data corresponding to the user and the first one of the sequence of address generation scripts.

18. The computer system of claim 15, wherein the validity system comprises:
a uniqueness detector for comparing the first electronic address to a set of previously created electronic addressed to determine if the first address is unique; and
a compliance detector for comparing the first electronic address to the predetermined addressing standard to determine if the first electronic address is compliant.

19. The computer system of claim 18, wherein the set of previously created electronic addresses are stored in a repository with user data corresponding to the user.

20. The computer system of claim 18, wherein the set of previously created electronic addresses are stored in an electronic address repository.

21. A computer-readable storage medium having a program product for causing a computer to automatically assign electronic addresses to users, said program product comprising:
program code for automatically generating a first electronic address for assigning to a user according to a first one of a sequence of address generation scripts in order of which address generation script is preferred by an organization to which the user belongs, each address generation script including a unique template that defines a structure for an electronic address;
program code for automatically determining whether the first electronic address is valid, wherein the first electronic address is valid if the first electronic address is unique and complies with a predetermined addressing standard; and
program code for automatically assigning the first electronic address to the user if the first electronic address is valid, wherein a second electronic address is generated according to a next one of the sequence of address generation scripts if the first electronic address is not valid, and wherein if the second electronic address is not valid, an administrator is allowed to enable a process to automatically append at least one numeric digit to the script-generated address that does not comply with the predetermined addressing standard, wherein appending the at least one numeric digit creates the valid electronic address,
wherein validation of the electronic address is performed within an address generation system without testing the uniqueness in a network environment.

22. The computer-readable storage medium of claim 21, wherein the first and second electronic addresses are electronic mailing addresses.

23. The computer-readable storage medium of claim 21, wherein the first electronic address is generated according to user data corresponding to the user and the first one of the sequence of address generation scripts.

24. The computer-readable storage medium of claim 21, wherein the program code for determining whether the first electronic address is valid comprises:
program code for comparing the first electronic address to a set of previously created electronic addressed to determine if the first address is unique; and
program code for comparing the first electronic address to the predetermined addressing standard to determine if the first electronic address is compliant.

25. The computer-readable storage medium of claim 24, wherein the set of previously created electronic addresses are stored in a repository with user data corresponding to the user.

26. The computer-readable storage medium of claim 24, wherein the set of previously created electronic addresses are stored in an electronic address repository.

* * * * *